(12) United States Patent
Lee et al.

(10) Patent No.: US 9,367,709 B2
(45) Date of Patent: Jun. 14, 2016

(54) MOBILE TERMINAL

(71) Applicant: BLUEBIRD INC., Seoul (KR)

(72) Inventors: Jang Won Lee, Seoul (KR); Chan Woong Park, Seoul (KR)

(73) Assignee: BLUEBIRD INC. (KR)

( * ) Notice: Subject to any disclaimer, the term of this patent is extended or adjusted under 35 U.S.C. 154(b) by 0 days.

(21) Appl. No.: 14/425,002

(22) PCT Filed: Aug. 27, 2013

(86) PCT No.: PCT/KR2013/007686
§ 371 (c)(1),
(2) Date: Feb. 27, 2015

(87) PCT Pub. No.: WO2014/035122
PCT Pub. Date: Mar. 6, 2014

(65) Prior Publication Data
US 2015/0227762 A1     Aug. 13, 2015

(51) Int. Cl.
G06F 21/00    (2013.01)
G06F 21/87    (2013.01)
H04M 1/02     (2006.01)
H05K 5/02     (2006.01)

(52) U.S. Cl.
CPC .............. *G06F 21/87* (2013.01); *H04M 1/0202* (2013.01); *H05K 5/0208* (2013.01)

(58) Field of Classification Search
USPC ........................................................ 726/34
See application file for complete search history.

(56) References Cited

U.S. PATENT DOCUMENTS

| 4,691,350 | A  |   | 9/1987  | Kleijne et al. |
|-----------|----|----|---------|----------------|
| 4,811,288 | A  |   | 3/1989  | Kleijne et al. |
| 2005/0275538 | A1 | * | 12/2005 | Kulpa ............ H05K 5/0208 340/568.2 |
| 2010/0177487 | A1 | * | 7/2010  | Arshad .......... G06F 21/86 361/737 |
| 2011/0031985 | A1 | * | 2/2011  | Johnson ......... G06F 21/86 324/681 |

FOREIGN PATENT DOCUMENTS

| KR | 200322183    |   | 7/2003  |
|----|--------------|---|---------|
| KR | 20060046933  | A | 5/2006  |
| KR | 20060070684  | A | 6/2006  |
| KR | 20080105500  | A | 12/2008 |
| KR | 20110082867  | A | 7/2011  |

* cited by examiner

*Primary Examiner* — Jason Lee

(57) ABSTRACT

Disclosed is a mobile terminal. The mobile terminal according to the present inventive concept, comprises: a case; a printed circuit board (PCB), which is arranged inside of the case, and on the surface of which is a temper detect pattern comprising first and second contact-type conductive patterns that are arranged adjacent to each other and a non-contact-type conductive pattern that is arranged apart from the first and second contact-type conductive patterns are provided; a detection circuit, which is electrically connected to the tamper detect pattern, for detecting whether the tamper detection pattern is conductive; and a pattern conduction module for controlling so that the first and second contact-type conductive patterns are conductive when the case is assembled, and the conduction of the first and second contact-type conductive patterns is released when the case is disassembled.

10 Claims, 10 Drawing Sheets

MOBILE TERMINAL

TECHNICAL FIELD

The present invention relates to a mobile terminal, and more particularly, to a mobile terminal capable of detecting tampering.

BACKGROUND ART

Mobile terminals are devices that may be freely used by being carried without restriction of place and typically include payment terminals used for credit cards, mobile communication terminals such as mobile phones, and personal digital assistants (PDAs) called personal portable terminals. Accordingly, the term "mobile terminal" may be interpreted to include all the above-described devices. In the following description, for convenience of explanation, the mobile terminal means the payment terminal.

The payment terminal stores or processes a large amount of important data, for example, personal information. Accordingly, using a tamper detection device for detecting tamper through hardware or software to hack the important data is necessary.

One typical tampering is hacking important data by disassembling a payment terminal. In other words, important data may be hacked from various circuit parts mounted on a printed circuit board by disassembling a case in which the printed circuit board is arranged.

Accordingly, a payment terminal of the related art includes a case disassembling recognition portion for recognizing disassembly of a case, and a hacking preventing portion connected to the case disassembling recognition portion and erasing important data when the case is disassembled.

The case disassembling recognition portion is configured in a switching method to recognize assembly and disassembly of the case. In other words, the case disassembling recognition portion includes a tamper detect pattern provided on the printed circuit board and having two conductive members arranged apart from each other, and a movable member movably provided between the printed circuit board and the case and electrically connecting the two conductive members through moving.

The case disassembling recognition portion recognizes assembly of the case as the movable member contacts the conductive member during assembly of the case, and disassembly of the case as the movable member is released from the contact with the conductive member during disassembly of the case.

However, the tempering becomes more complicated and a method of confusing the case disassembling recognition portion has developed.

One of the tampering is to inject a conductive liquid into the tamper detect pattern through a small hole formed in the case.

When the conductive liquid is injected into the tamper detect pattern, the two separated conductive members are electrically connected to each other through the conductive liquid. Thus, even when the movable member is released from the contact with the conductive member due to disassembly of the case, the case disassembling recognition portion may not recognize disassembly of the case.

Accordingly, there is a demand for development of a mobile terminal that may deal with tampering by confusing the case disassembling recognition portion like the method of injecting a conductive liquid into the tamper detect pattern.

DETAILED DESCRIPTION OF THE INVENTIVE CONCEPT

Technical Problem

The present inventive concept provides a mobile terminal capable of preventing hacking of important data by disabling tampering which is intended to hide disassembly of a case.

Technical Solution

According to an aspect of the present inventive concept, there is provided a mobile terminal including a case, a printed circuit board (PCB) arranged inside the case and having a surface on which a tamper detect pattern is mounted, the tamper detect pattern comprising first and second contact-type conductive patterns that are arranged adjacent to each other and a non-contact-type conductive pattern arranged apart from the first and second contact-type conductive patterns, a detection circuit electrically connected to the tamper detect pattern and detecting whether the tamper detect pattern is conductive, and a pattern conduction module arranged between the case and the PCB and controlling so that the first and second contact-type conductive patterns are conductive when the case is assembled, and the conduction of the first and second contact-type conductive patterns is released when the case is disassembled.

The non-contact-type conductive pattern may be provided in a center area of the tamper detect pattern.

The tamper detect pattern may have a concave shape such that a height of the tamper detect pattern decreases toward the center area.

The first and second contact-type conductive patterns may be arranged around the non-contact-type conductive pattern that is used as an imaginary center, to be radially separated from each other.

The first and second contact-type conductive patterns may have a ring shape.

The pattern conduction module may be formed of an elastic pattern conduction module that is elastically biased in a direction separated from any one of the first and second contact-type conductive patterns.

The elastic pattern conduction module may include a module body, a conductive fixed portion provided at one side of the module body and electrically connected and fixed to the first contact-type conductive pattern, and a conductive connection portion provided in the module body and arranged adjacent to the conductive fixed portion to be selectively and electrically connected to or released from the second contact-type conductive pattern.

The conductive fixed portion may have a ring shape around the non-contact-type conductive pattern as an imaginary center.

The conductive connection portion may be coaxially arranged with the conductive fixed portion between the non-contact-type conductive pattern and the conductive fixed portion.

The conductive connection portion may protrude from a lower surface of the module body toward the second contact-type conductive pattern.

The tamper detect pattern may have a circular shape and the pattern conduction module may have a dome shape for shielding the tamper detect pattern, and the first and second contact-type conductive patterns and the non-contact-type conductive pattern may be formed of a conductive material.

Advantageous Effects

According to the exemplary embodiments of the present inventive concept, since a non-contact-type conductive pattern is arranged apart from first and second contact-type conductive patterns that are arranged adjacent to each other and electrically connected and disconnected by a pattern conduction module, even when a conductive liquid is injected into a tamper detect pattern in order to forcibly connect the first and second contact-type conductive patterns, the non-contact-type conductive pattern is connected to the first contact-type conductive pattern or the second contact-type conductive pattern through the conductive liquid, thereby detecting tampering through a detect circuit.

BEST MODE

Figure 1:
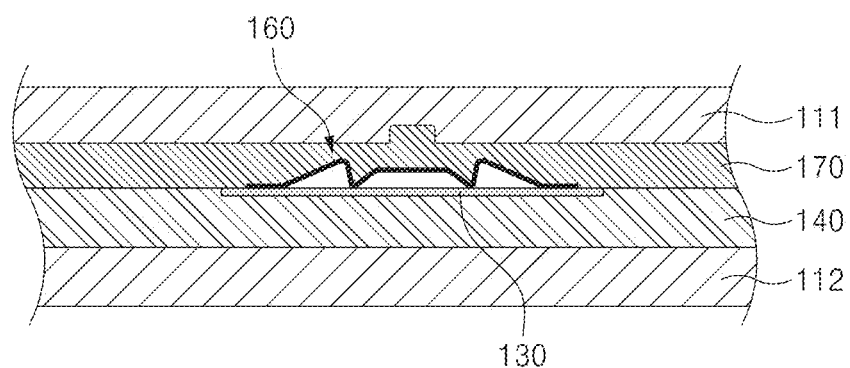
FIG. 1 schematically illustrates an inner structure of a mobile terminal according to an exemplary embodiment.

The attached drawings for illustrating preferred embodiments of the present invention are referred to in order to gain a sufficient understanding of the present invention, the merits thereof, and the objectives accomplished by the implementation of the present invention.

Hereinafter, the present invention will be described in detail by explaining preferred embodiments of the invention with reference to the attached drawings. Like reference numerals in the drawings denote like elements.

Although the term "mobile terminal" used hereunder is interpreted to include payment terminals used for credit cards, mobile communication terminals such as mobile phones, and personal digital assistants (PDAs) called personal portable terminals, the term is indicated as a mobile terminal for convenience of explanation.

Figure 2:
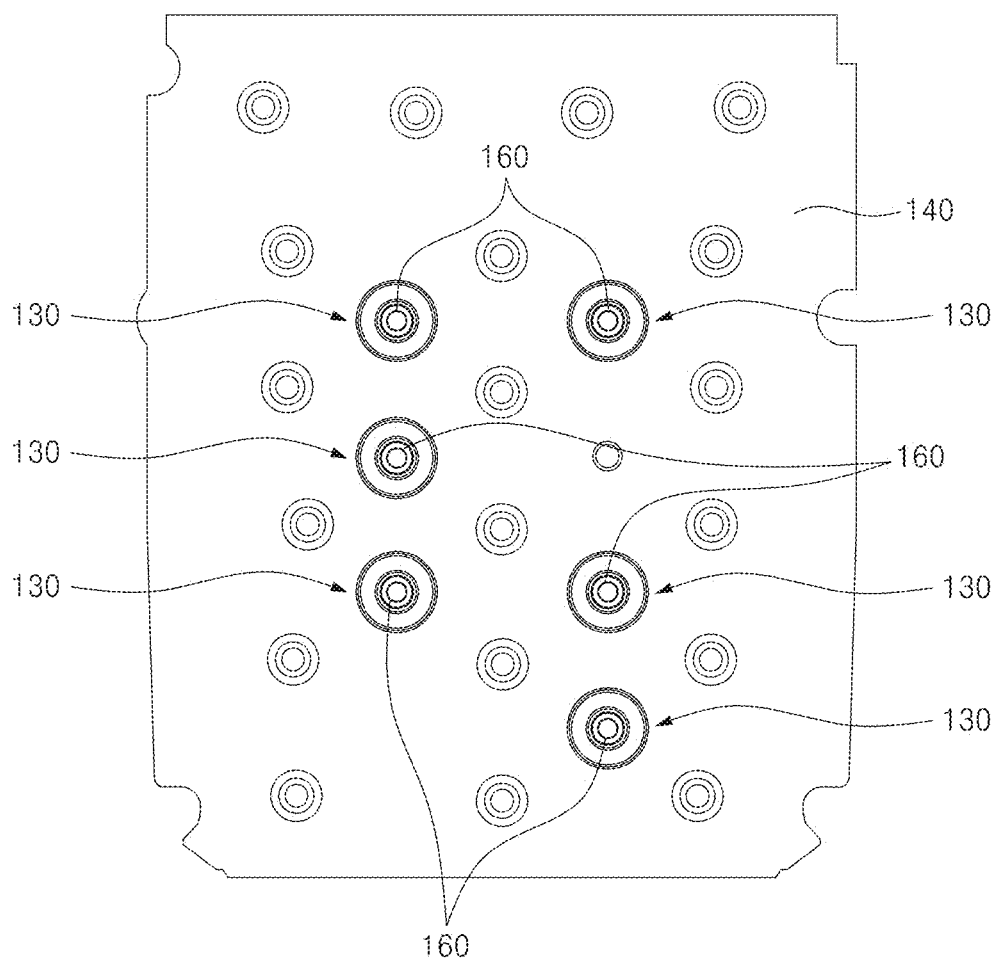
FIG. 2 is a plan view of a printed circuit board of FIG. 1.
Figure 3:
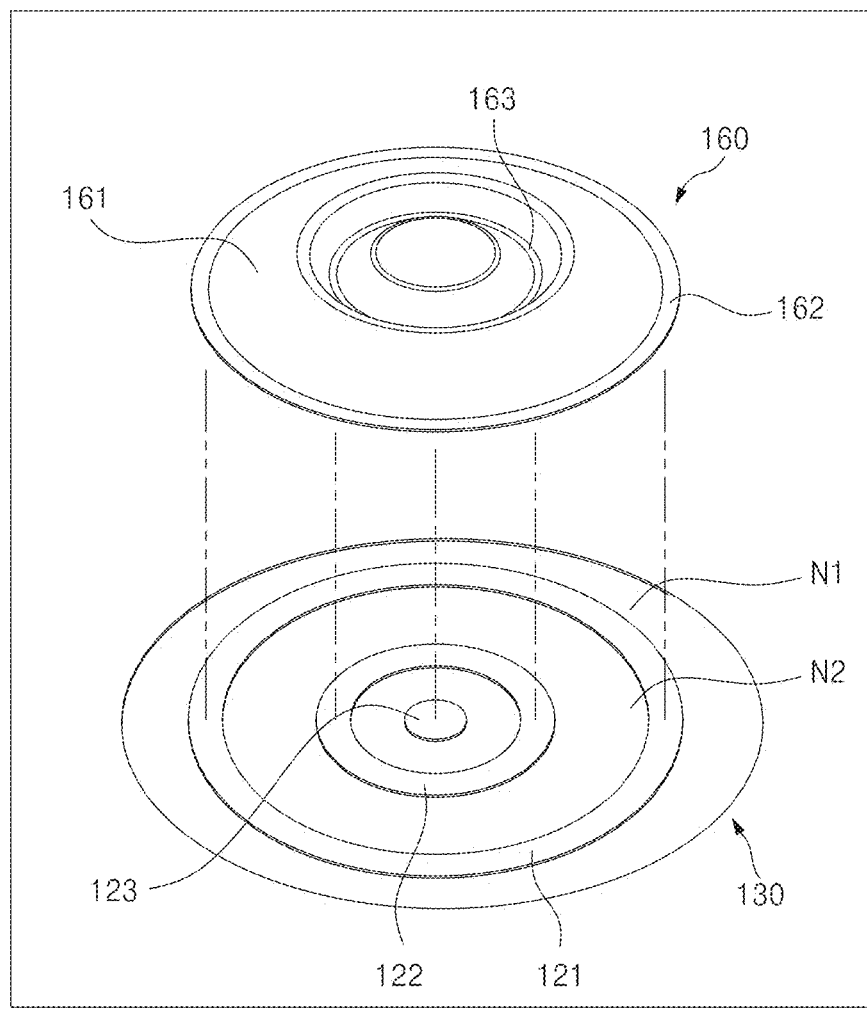
FIG. 3 is an exploded perspective view of a tamper detect pattern and a pattern conduction module of FIG. 1.
Figure 4:
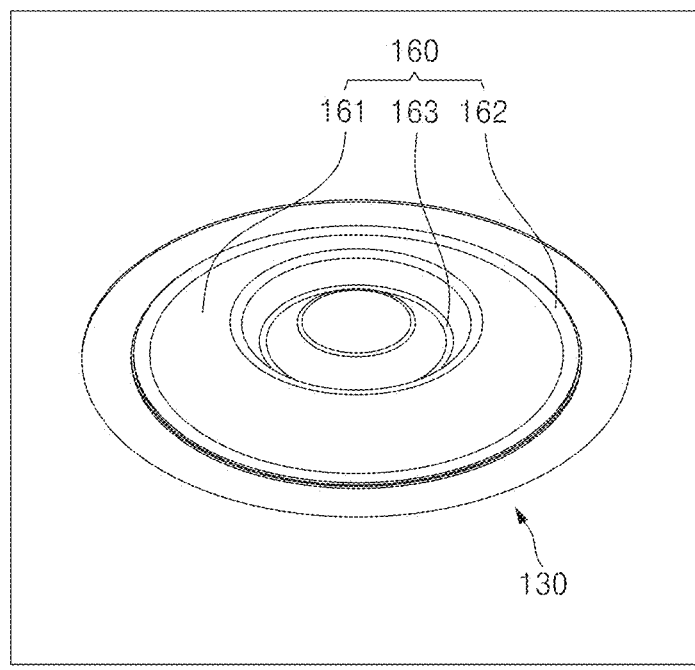
FIG. 4 is a perspective view illustrating that a pattern conduction module is arranged on the tamper detect pattern of FIG. 1.
Figure 5:
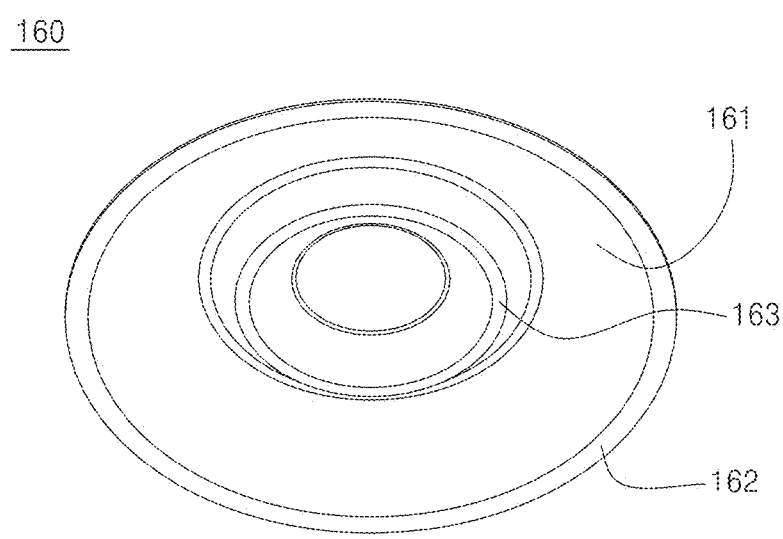
FIG. 5 is a perspective view of the pattern conduction module of FIG. 3 viewed from the bottom thereof.
Figure 6:
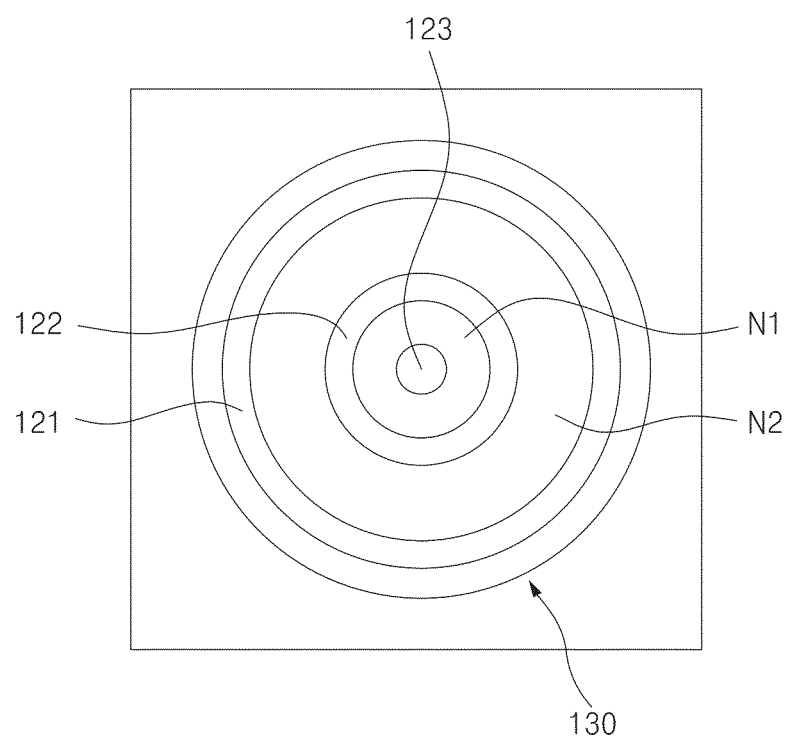
FIG. 6 is a plan view of the tamper detect pattern of FIG. 3.
Figure 7:
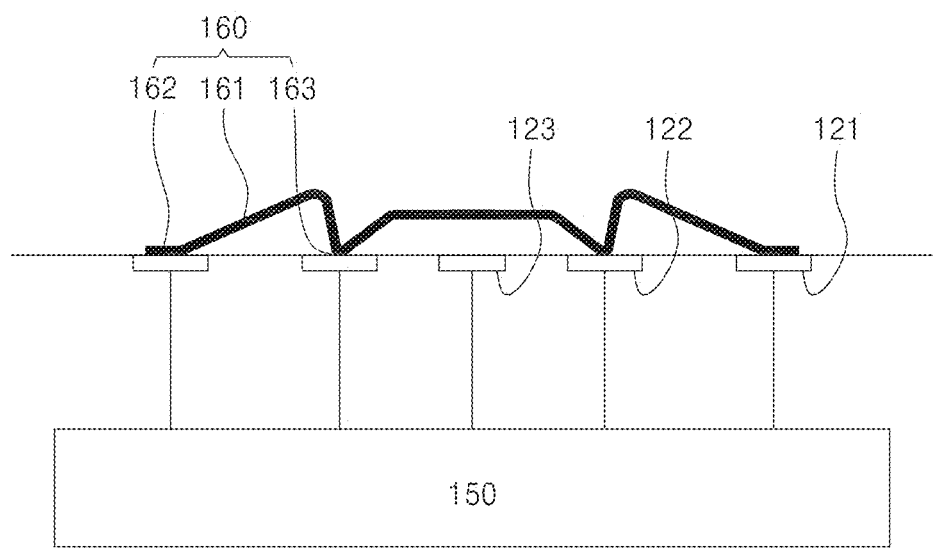
FIG. 7 is an operational state view of the pattern conduction module of FIG. 1 being pressed due to the assembly of a case.
Figure 8:
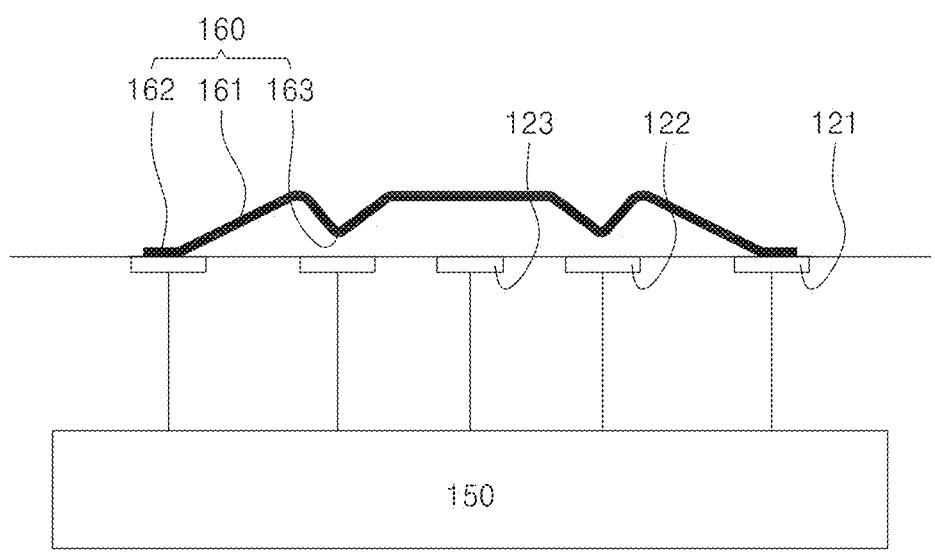
FIG. 8 is an operational state view of the pattern conduction module of FIG. 1 being released from pressing due to the disassembly of the case.
Figure 9:
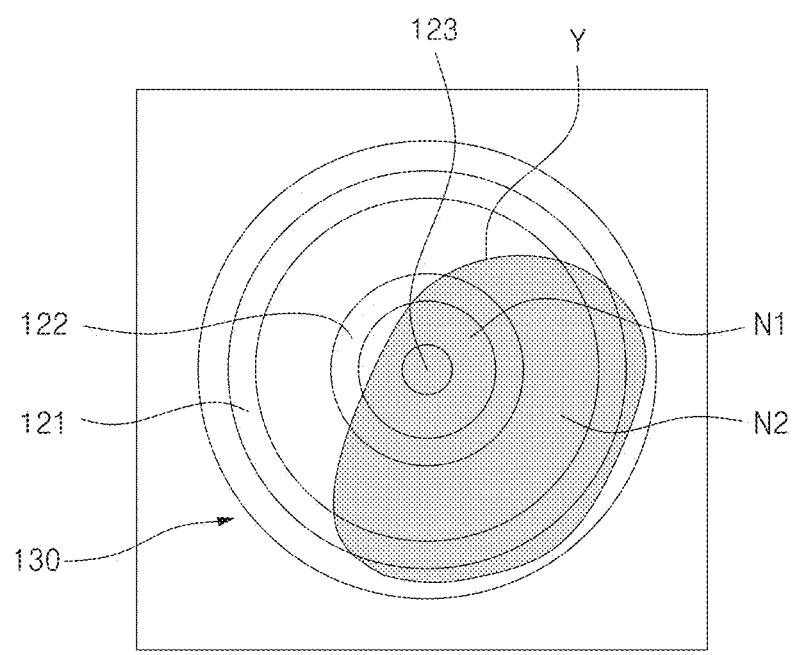
FIG. 9 illustrates a state in which a conductive liquid is injected into the tamper detect pattern of FIG. 1.

FIG. 1 schematically illustrates an inner structure of a mobile terminal according to an exemplary embodiment. FIG. 2 is a plan view of a printed circuit board of FIG. 1. FIG. 3 is an exploded perspective view of a tamper detect pattern and a pattern conduction module of FIG. 1. FIG. 4 is a perspective view illustrating that a pattern conduction module is arranged on the tamper detect pattern of FIG. 1. FIG. 5 is a perspective view of the pattern conduction module of FIG. 3 viewed from the bottom thereof. FIG. 6 is a plan view of the tamper detect pattern of FIG. 3. FIG. 7 is an operational state view of the pattern conduction module of FIG. 1 being pressed due to the assembly of a case. FIG. 8 is an operational state view of the pattern conduction module of FIG. 1 being released from pressing due to the disassembly of the case. FIG. 9 illustrates a state in which a conductive liquid is injected into the tamper detect pattern of FIG. 1.

As illustrated in FIGS. 1 to 9, the mobile terminal according to an exemplary embodiment includes a the case 111 and 112, a printed circuit board (PCB) 140 arranged inside of the case 111 and 112 and having a surface on which a temper detect pattern 130 is mounted, the temper detect pattern 130 including first and second contact-type conductive patterns 121 and 122 that are arranged adjacent to each other and a non-contact-type conductive pattern 123 that is arranged apart from the first and second contact-type conductive patterns 121 and 122; a detection circuit 150 electrically connected to the tamper detect pattern 130 and detecting whether the tamper detection pattern 130 is conductive; and a pattern conduction module 160 arranged between the case 111 and 112 and the PCB 140 for controlling so that the first and second contact-type conductive patterns 121 and 122 are conductive when the case 111 and 112 is assembled, and the conduction of the first and second contact-type conductive patterns 121 and 122 is released when the case 111 and 112 is disassembled.

The case 111 and 112 protects the PCB 140 by encompassing the PCB 140 during assembly and may be assembled or disassembled. In the present exemplary embodiment, the case 111 and 112 includes an upper case 111 and a lower case 112.

The tamper detect pattern 130 is provided on the PCB 140. In the present exemplary embodiment, the tamper detect pattern 130 has a circular shape. However, the right scope of the present inventive concept is not limited thereto and the tamper detect pattern 130 may have a polygonal shape.

Also, the tamper detect pattern 130 is provided in a multiple number for more accurate detection of tampering, in the present exemplary embodiment, six tamper detect patterns 130 are provided on the PCB 140 for convenience of explanation.

The tamper detect pattern 130 includes the first and second contact-type conductive patterns 121 and 122 arranged to adjacent to each other and the non-contact-type conductive pattern 123 arranged apart from the first and second contact-type conductive patterns 121 and 122.

In the present exemplary embodiment, the first and second contact-type conductive patterns 121 and 122 and the non-contact-type conductive pattern 123 are formed of a conductive material conducting electricity.

The first and second contact-type conductive patterns 121 and 122 are electrically connected to the pattern conduction module 160. Detailed descriptions of the first and second contact-type conductive patterns 121 and 122 and the non-contact-type conductive pattern 123 are presented later for convenience of explanation.

The pattern conduction module 160 is arranged between the case 111 and 112 and the PCB 140. In the present exemplary embodiment, the pattern conduction module 160 is provided in a dome shape for shielding the tamper detect pattern 130.

The pattern conduction module 160 electrically connects the first and second contact-type conductive patterns 121 and 122 during assembly of the case 111 and 112, and releases the electric connection between the first and second contact-type conductive patterns 121 and 122 during disassembly of the case 111 and 112.

In the present exemplary embodiment, the pattern conduction module 160 is formed of an elastic pattern conduction module 160 that is elastically biased in a direction away from any one of the first and second contact-type conductive patterns 121 and 122.

The elastic pattern conduction module 160 includes a module body 161, a conductive fixed portion 162 formed at one side of the module body 161 and electrically connected and fixed to the first contact-type conductive pattern 121, and a conductive connection portion 163 provided in the module body 161 and arranged adjacent to the conductive fixed portion 162 to be selectively and electrically connected to or released from the second contact-type conductive pattern 122.

The conductive fixed portion 162 is electrically connected and fixed to the first contact-type conductive pattern 121. In the present exemplary embodiment, the conductive fixed portion 162 is connected and fixed to the first contact-type conductive pattern 121 via soldering, etc.

Also, in the present exemplary embodiment, the conductive fixed portion 162 is provided in a shape of a ring using the non-contact-type conductive pattern 123 as an imaginary center.

The conductive connection portion 163 is provided in the module body 161 at a position adjacent to the conductive fixed portion 162. Also, the conductive connection portion 163 is selectively electrically connected to or released from the second contact-type conductive pattern 122.

In the present exemplary embodiment, the conductive connection portion 163 is elastically biased in a direction away from the second contact-type conductive pattern 122 during the assembly of the case 111 and 112. In other words, the module body 161 elastically biases the conductive connection portion 163 in a direction away from the second contact-type conductive pattern 122. Accordingly, the conductive connection portion 163 is separated from the second contact-type conductive pattern 122 by an elastic restoration force during the disassembly of the case 111 and 112.

As a result, the conductive connection portion 163 contacts the second contact-type conductive pattern 122 by being pressed overcoming the elastic restoration force of the module body 161 during the assembly of the case 111 and 112, and is released from the contact with the second contact-type conductive pattern 122 by the elastic restoration force of the module body 161 during the disassembly of the case 111 and 112.

The conductive connection portion 163 is coaxially arranged with the conductive fixed portion 162 between the non-contact-type conductive pattern 123 and the conductive fixed portion 162.

Also, the conductive connection portion 163 protrudes from a lower surface of the module body 161 toward the second contact-type conductive pattern 122. As such, as the conductive connection portion 163 protrudes toward the second contact-type conductive pattern 122, an excessive pressing force is not necessary during the assembly of the case 111 and 112 and thus the conductive connection portion 163 and the second contact-type conductive pattern 122 easily contact each other.

Alternatively, according to the present exemplary embodiment, the mobile terminal further includes a pressing member 170 pressing the conductive connection portion 163 against the second contact-type conductive pattern 122. The pressing member 170 may be provided on the upper case 111 or arranged between the upper case 111 and the pattern conduction module 160.

Also, the non-contact-type conductive pattern 123 may be provided at a center area of the tamper detect pattern 130. The non-contact-type conductive pattern 123 may be provided in a circular or polygonal shape. In the present exemplary embodiment, for convenience of explanation, the non-contact-type conductive pattern 123 has a circular shape.

In the present exemplary embodiment, the first and second contact-type conductive patterns 121 and 122 are arranged around the imaginary center of the non-contact-type conductive pattern 123 to be radially separated from each other. Also, in the present exemplary embodiment, in the first and second contact-type conductive patterns 121 and 122, the second contact-type conductive pattern 122 and the first contact-type conductive pattern 121 are sequentially arranged around the imaginary center of the non-contact-type conductive pattern 123.

Also, in the present exemplary embodiment, the first and second contact-type conductive patterns 121 and 122 have a ring shape. In other words, the first and second contact-type conductive patterns 121 and 122 are coaxially arranged around as the imaginary center of the non-contact-type conductive pattern 123.

Accordingly, in the present exemplary embodiment, the non-contact-type conductive pattern 123 is arranged adjacent to the second contact-type conductive pattern 122. As such, as the non-contact-type conductive pattern 123 is arranged adjacent to the second contact-type conductive pattern 122, when a conductive liquid Y is injected into the tamper detect pattern 130, the non-contact-type conductive pattern 123 is electrically connected to the second contact-type conductive pattern 122.

The electric connection between the non-contact-type conductive pattern 123 and the second contact-type conductive pattern 122 is detected by the detection circuit 150. Accordingly, hacking of important data may be prevented by a method such as erasing data.

The tamper detect pattern 130 further includes a first non-conductive area N1 arranged between the non-contact-type conductive pattern 123 and the second contact-type conductive pattern 122, and a second non-conductive area N2 is arranged between the second contact-type conductive pattern 122 and the first contact-type conductive pattern 121.

Accordingly, the non-contact-type conductive pattern 123 and the second contact-type conductive pattern 122 are separated by the first non-conductive area N1, and the second contact-type conductive pattern 122 and the first contact-type conductive pattern 121 are separated by the second non-conductive area N2.

The operation of the mobile terminal configured as above is described below with reference to FIGS. 1 to 9.

First, during the assembly of the case 111 and 112, as illustrated in FIG. 7, the pattern conduction module 160 is pressed due to the assembly of the case 111 and 112. Accordingly, the conductive connection portion 163 contacts the second contact-type conductive pattern 122. The electrical connection between the conductive connection portion 163 and the second contact-type conductive pattern 122 is detected by the detection circuit 150.

Next, during the disassembly of the case 111 and 112, as illustrated in FIG. 8, the pattern conduction module 160 is released from the pressing due to the disassembly of the case 111 and 112. Accordingly, the conductive connection portion 163 is released from the contact with the second contact-type conductive pattern 122.

Since the release of the electric connection between the conductive connection portion 163 and the second contact-type conductive pattern 122 is detected by the detection circuit 150, tampering accompanied with the disassembly of the case 111 and 112.

Next, as illustrated in FIG. 9, when the conductive liquid Y is injected into the tamper detect pattern 130 for hacking, the non-contact-type conductive pattern 123 is electrically connected to the second contact-type conductive pattern 122 or the first contact-type conductive pattern 121. The electric connection between the non-contact-type conductive pattern 123 and the second contact-type conductive pattern 122 or the electric connection between the non-contact-type conductive pattern 123 and the second contact-type conductive pattern 122 is detected by the detection circuit 150.

As a result, the detection circuit 150 may detect tampering accompanying the disassembly of the case 111 and 112 by forcibly connecting the first and second contact-type conductive patterns 121 and 122 through the conductive liquid Y.

As such, since the mobile terminal according to the present exemplary embodiment includes the non-contact-type conductive pattern 123 arranged apart from the first and second contact-type conductive patterns 121 and 122 that are arranged adjacent to each other and electrically connected to or disconnected from each other by the pattern conduction module 160, even when the conductive liquid Y is injected into the tamper detect pattern 130 to forcibly connect the first and second contact-type conductive patterns 121 and 122, the detection circuit 150 may detect tampering occurring as the non-contact-type conductive pattern 123 is connected to the first contact-type conductive pattern 121 or the second contact-type conductive pattern 122 through the conductive liquid Y.

Figure 10:
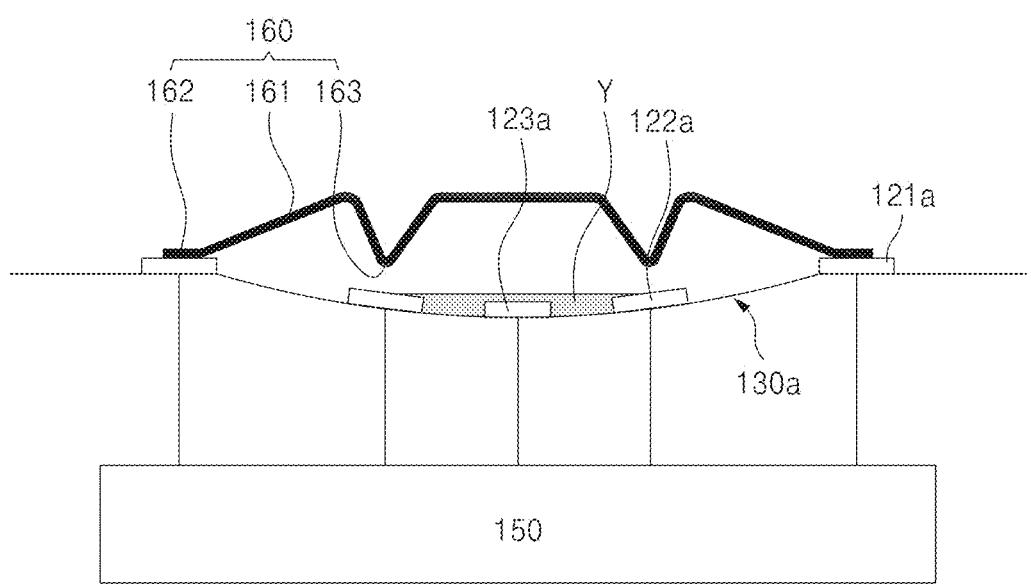
FIG. 10 illustrates the tamper detect pattern of a mobile terminal according to another exemplary embodiment.

FIG. 10 illustrates the tamper detect pattern of a mobile terminal according to another exemplary embodiment. Like reference numerals in FIGS. 1 to 9 refer to like elements and thus redundant descriptions of the same elements are omitted.

Since the structure of the present exemplary embodiment is substantially the same as that of the above-described exemplary embodiment of FIGS. 1 to 9, except a tamper detect pattern 130a, the following description of the present exemplary embodiment mainly discusses the tamper detect pattern 130a.

In the present exemplary embodiment, the tamper detect pattern 130a has a concave shape such that the height of the tamper detect pattern 130a decreases toward a center area.

As such, in the mobile terminal according to the present exemplary embodiment, as the height of the tamper detect pattern 130a decreases toward the center area in a concave shape and a non-contact-type conductive pattern 123a is arranged in the center area of the tamper detect pattern 130a, when the conductive liquid Y is injected into the tamper detect pattern 130a, the conductive liquid Y flows toward the center area that is concave.

Since the flow of the conductive liquid Y further facilitates electric connection between the non-contact-type conductive pattern 123a and a first contact-type conductive pattern 121a or a second contact-type conductive pattern 122a, the detection circuit 150 may more easily detect tampering accompanying the injection of the conductive liquid Y.

The preferred embodiments should be considered in descriptive sense only and not for purposes of limitation.

While this invention has been particularly shown and described with reference to preferred embodiments thereof, it will be understood by those of ordinary skill in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

INDUSTRIAL APPLICABILITY

The present inventive concept may be used for payment terminals used for credit cards, mobile communication terminals such as mobile phones, and personal digital assistants (PDAs) called personal portable terminals.

The invention claimed is:

1. A mobile terminal comprising:
   a case;
   a printed circuit board (PCB) arranged inside the case and having a surface on which a tamper detect pattern is mounted, the tamper detect pattern comprising a first and a second contact-type conductive patterns that are arranged adjacent to each other and a non-contact-type conductive pattern arranged apart from the first and the second contact-type conductive patterns,
   wherein the non-contact-type conductive pattern is electrically connected to the first contact-type conductive pattern or the second contact-type conductive pattern when a conductive liquid is injected into the temper detect pattern;
   a detection circuit electrically connected to the tamper detect pattern and detecting whether the tamper detect pattern is conductive; and
   a pattern conduction module arranged between the case and the PCB and controlling so that the first and the second contact-type conductive patterns are conductive when the case is assembled, and the conduction of the first and the second contact-type conductive patterns is released when the case is disassembled
   wherein the non-contact-type conductive pattern is provided in a center area of the tamper detect pattern, and
   wherein the first and the second contact-type conductive patterns are arranged around the non-contact-type conductive pattern that is used as an imaginary center, to be radially separated from each other.

2. The mobile terminal of claim 1, wherein the tamper detect pattern has a concave shape such that a height of the tamper detect pattern decreases toward the center area.

3. The mobile terminal of claim 1, wherein the first and the second contact-type conductive patterns have a ring shape.

4. The mobile terminal of claim 3, wherein the pattern conduction module is formed of an elastic pattern conduction module that is elastically biased in a direction separated from any one of the first and the second contact-type conductive patterns.

5. The mobile terminal of claim 4, wherein the elastic pattern conduction module comprises:
   a module body;
   a conductive fixed portion provided at one side of the module body and electrically connected and fixed to the first contact-type conductive pattern; and
   a conductive connection portion provided in the module body and arranged adjacent to the conductive fixed portion to be selectively and electrically connected to or released from the second contact-type conductive pattern.

6. The mobile terminal of claim 5, wherein the conductive fixed portion has a ring shape around the non-contact-type conductive pattern as an imaginary center.

7. The mobile terminal of claim 6, wherein the conductive connection portion is coaxially arranged with the conductive fixed portion between the non-contact-type conductive pattern and the conductive fixed portion.

8. The mobile terminal of claim 7, wherein the conductive connection portion protrudes from a lower surface of the module body toward the second contact-type conductive pattern.

9. The mobile terminal of claim 1, wherein the tamper detect pattern has a circular shape and the pattern conduction module has a dome shape for shielding the tamper detect pattern, and the first and the second contact-type conductive patterns and the non-contact-type conductive pattern are formed of a conductive material.

10. The mobile terminal of claim 1, wherein the non-contact-type conductive pattern is electrically connected to the first contact-type conductive pattern or the second contact-type conductive pattern when the conductive liquid is injected into the temper detect pattern and an electrical connection between the non-contact-type conductive pattern and the second contact-type conductive pattern or the first contact-type conductive pattern is detected by the detection circuit.

* * * * *